United States Patent [19]

Sedlack

[11] Patent Number: 5,536,066
[45] Date of Patent: Jul. 16, 1996

[54] HARNESS FOR FIXING A CHILD RESTRAINT ONTO A SCHOOL BUS SEAT

[75] Inventor: Mark A. Sedlack, Cuyahoga Falls, Ohio

[73] Assignee: Century Products Company, Macedonia, Ohio

[21] Appl. No.: 228,824

[22] Filed: Apr. 18, 1994

[51] Int. Cl.⁶ .................................................. B60N 2/28
[52] U.S. Cl. ........................... 297/250.1; 297/468
[58] Field of Search ............................... 297/250.1, 468, 297/485

[56] References Cited

U.S. PATENT DOCUMENTS

| | | | |
|---|---|---|---|
| 2,437,585 | 3/1948 | Zimmern | 297/468 |
| 4,758,048 | 7/1988 | Shuman | 297/468 |
| 5,131,682 | 7/1992 | Reed | 297/468 X |

FOREIGN PATENT DOCUMENTS

| | | | |
|---|---|---|---|
| 3850 | 9/1979 | European Pat. Off. | 297/250.1 |
| 3342594 | 6/1965 | Germany | 297/468 |
| 2712917 | 9/1978 | Germany | 297/250.1 |

*Primary Examiner*—Peter R. Brown
*Attorney, Agent, or Firm*—Graham & James

[57] ABSTRACT

A securing structure for fixing an child restraint designed for automobile seats onto a bench type seat of the kind commonly found on school buses. The securing structure comprises a fabric seat belt harness secured by seat belt buckles onto an fastening anchor that is attached to the bench seat frame. At least one slack take-up tensioning buckle ensures that the harness can be tensioned snugly around the child restraint. In one embodiment the fastening anchor is an elongated tongue bolted to the frame and thin enough to be slid out of the way in the seam of the seat when not being used to secure the harness. In another embodiment an elongated hook is used.

4 Claims, 3 Drawing Sheets

5,536,066

HARNESS FOR FIXING A CHILD RESTRAINT ONTO A SCHOOL BUS SEAT

BACKGROUND OF THE INVENTION

This invention relates to a securing device for fixing a child restraint or baby seat to a bench type seat as of the kind found commonly in school buses.

Child restraints generally are of the type which can be secured to the seat of an automobile, containing restraining straps extending from the back of the seat, behind the shoulders of the baby, down over the baby's torso, to join in the pelvic area between the baby's legs, and finally terminating in a buckle in the automobile seat. Generally such type of child restraints are contoured to fit snugly in the profile of an automobile seat, which is usually of the bucket type. Such child restraints can either face forward or face rearward, depending on the size, age, and weight of the child being held, among other factors.

Child restraint seats of the kind described above, while providing adequate protection for infants when seated in an automobile seat of the bucket type, cannot be as safely used in a bench type seat of the kind commonly found in public transportation vehicles, such as school buses. One reason is because child carrier seats designed for automobiles are not generally designed to be accommodated on a school bus seat.

SUMMARY OF THE INVENTION

The present invention is intended to reduce the above-mentioned drawbacks and one object of the present invention is therefore to secure an child restraint onto a bench seat of the kind commonly found in school buses.

A novel securing device is provided, which comprises a harness receiving an child restraint and a anchoring member attached to the bench seat. The anchoring member comprises an elongated tongue adapted to be bolted to a bench seat, together with a fastening member on one end thereof comprised of a seat belt buckle female receptacle, that receives a corresponding male receptacle buckle (tongue) on the harness. The harness ties the child restraint firmly to the bench seat in either a forward facing or rearward facing direction.

DETAILED DESCRIPTION OF THE PREFERRED EMBODIMENTS

Figure 1:
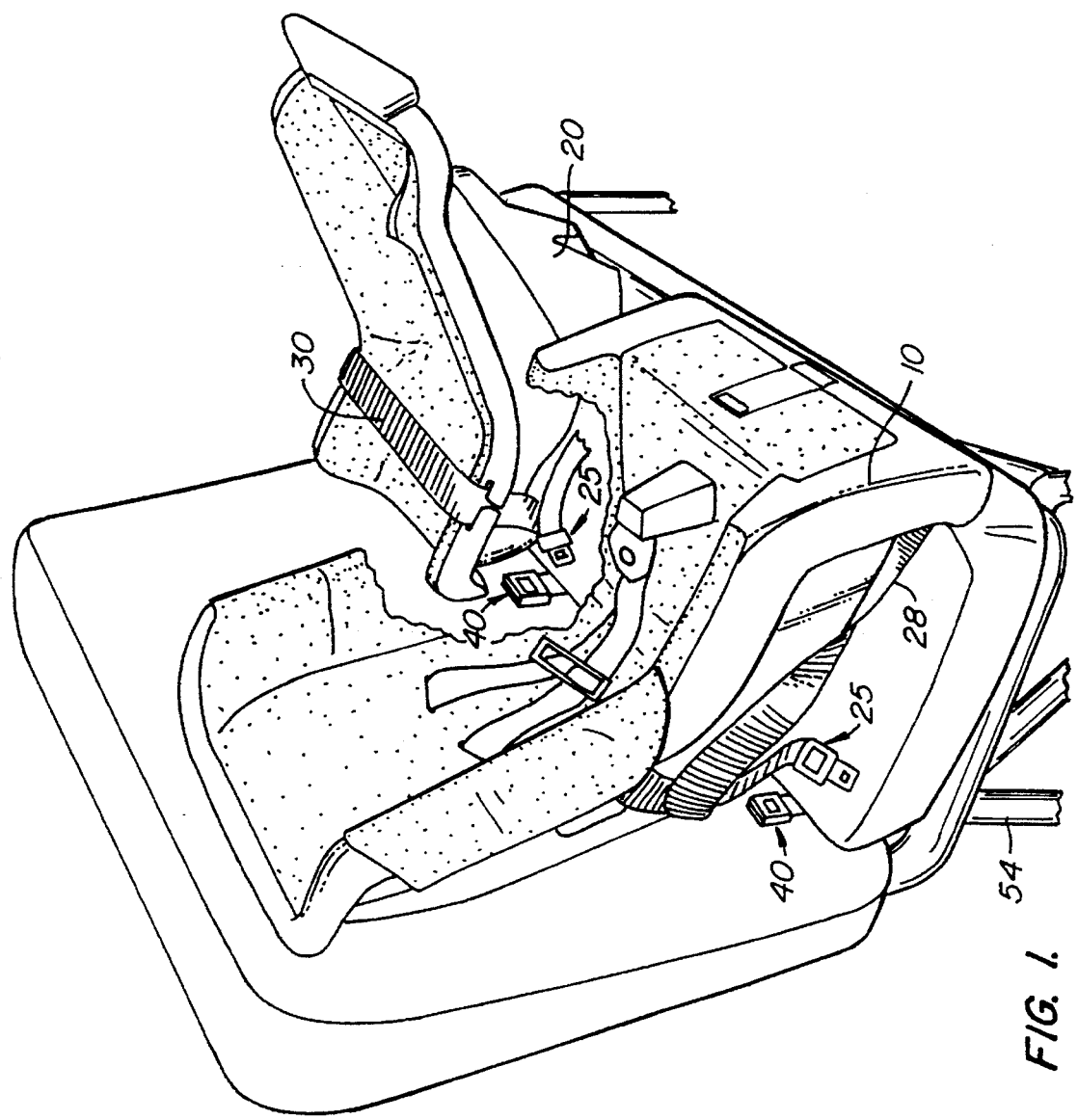
FIG. 1 is a perspective view showing a plurality of child restraints, facing forwardly and rearwardly, each being held by a harness of the present invention.
Figure 2:
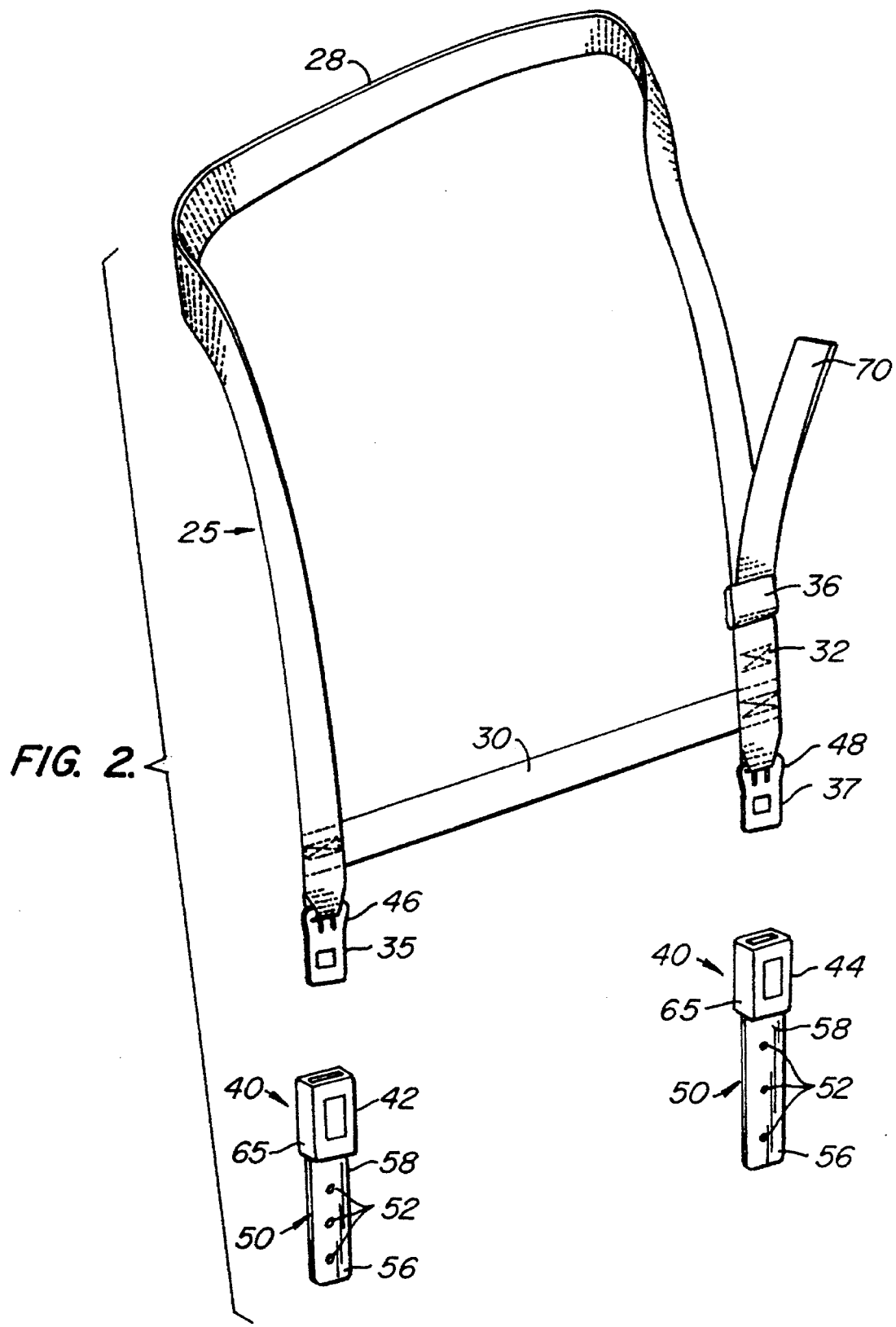
FIG. 2 is a perspective view of the securing device of the present invention.

Referring to FIG. 1, there is shown a plurality of child restraints 10, 20 being held by the harness of the present invention in both a forward facing and rearward facing manner. Referring to FIG. 2 as well, the harness 25 comprises a fabric belt having belt portions 28, 30 and 32, of approximately 2¼" to 2½ in width, together with a plurality of fastening members in the form of seat belt buckles, 35, 42 and 37, 44. The seat belt buckles are of the conventional type found in present automobile seat belts, having two fastening members, female (tongue receiving) portions 42, 44, receiving male portions 35, 37, (called tongues), as is well known per se in the art. Tensioning buckle 36 is a tensioning member for taking up slack, such as the kind of buckle found on manually adjusting automobile lap belts that employs friction between the buckle and belt to maintain the belt tight, such as a buckle with a sliding bar adjuster that employs a knurled bar to frictionally engage the fabric belt, as is also known per se in the art. The tensioning buckle may also be part of a combination tongue / tongue receiving seat belt buckle with a sliding bar adjuster, as is known per se in the art.

The anchoring mechanism 40 comprises two female receptacles 42, 44, of the conventional seat belt buckle type, receiving the male (tongue) members 35, 37, which receive the fabric belt at ends 46, 48. Female receptacles 42, 44 are connected to rigid strips of steel, or elongated tongues 50, having one or more apertures 52 therein. The elongated tongues 50 are at least 2.5" long, and preferably longer, with the apertures 52 at least approximately 0.438" in diameter, to receive a bolt to secure the tongues onto the frame 54 of the bench seat. Generally, one bolt will affix the anchoring tongue to the bench seat frame, with several apertures provided for vertical adjustment.

In the alternative to bolting the elongated tongues, other fastening means may be employed at the end of tongue 56 to attach the elongated tongue to the bench seat or bench seat frame. In addition, other anchoring and/or fastening means may be employed to attach the child carrier harness to the bench seat.

Figure 3:
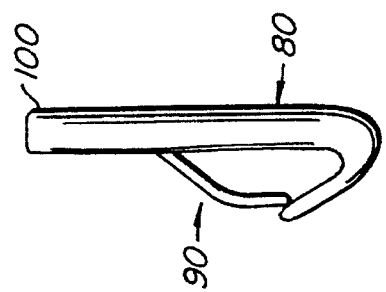
FIG. 3 is a side view of an alternate anchoring mechanism for the present invention.

Another fastening member is illustrated in FIG. 3. A clasp 80 of a hook type construction with a hook gripping portion receives the tubular portion of a bus seat frame and has a spring biased finger or guard 90 to prevent the hook from slipping off. The hook clasp would be secured to the harness 25 at a slot at end 100, in any number of ways, including a belt buckle or a direct connection, and there would be no need to affix the anchoring mechanism to the bus seat.

Turning attention to FIG. 2, as can be appreciated to those skilled in the art, the fixed seat belt buckle fastening members at the end of anchoring mechanism 40 may be either of the male or female type (as illustrated), depending on the kind of corresponding fastening member present on the harness that the anchor member is to engage. Elongated tongues 50, being thin and rigid in construction, may be slid out of the way into the seam of a bus seat when the harness 25 is not engaging the anchor mechanism 40. However, the anchoring mechanism 40 may be any suitable anchoring mechanism that achieves the purpose of attaching the harness to the bus seat frame. Thus, the anchoring mechanism 40 shown in FIG. 2 is but one of many possible implementations, as is readily apparent to those skilled in the art. Other fastening means between the harness 25 and the anchoring mechanism 40 may be employed by those skilled in the art, without departing from the scope of the invention as disclosed, taught and claimed herein.

The harness 25 is formed by a plurality of fabric belt portions 28, 30 and 32 stitched together, with belt 30 forming a lateral belt. Seat belt tensioning buckle 36 divides the belt and may be used as an additional tensioning device to tension the fabric belt 28 as it is passed through or around an child restraint, to pick up any slack present. Tensioning of the harness can also be provided at buckles 35 and 37, if buckles with tensioning means are provided there, such as buckles with sliding bar adjusters employing a knurled bar to frictionally engage the fabric belt, as is known per se in the art.

Seat belt tensioning buckle 36 on the end of belt 32 receives belt end 70, passing therein. Belt end 70 may be passed through an child restraint seat belt routing slot or around the child restraint seat. When passed through the carrier, the width of buckle 36 further prevents the belt end 70 from slipping back out of the child restraint.

Figure 4:
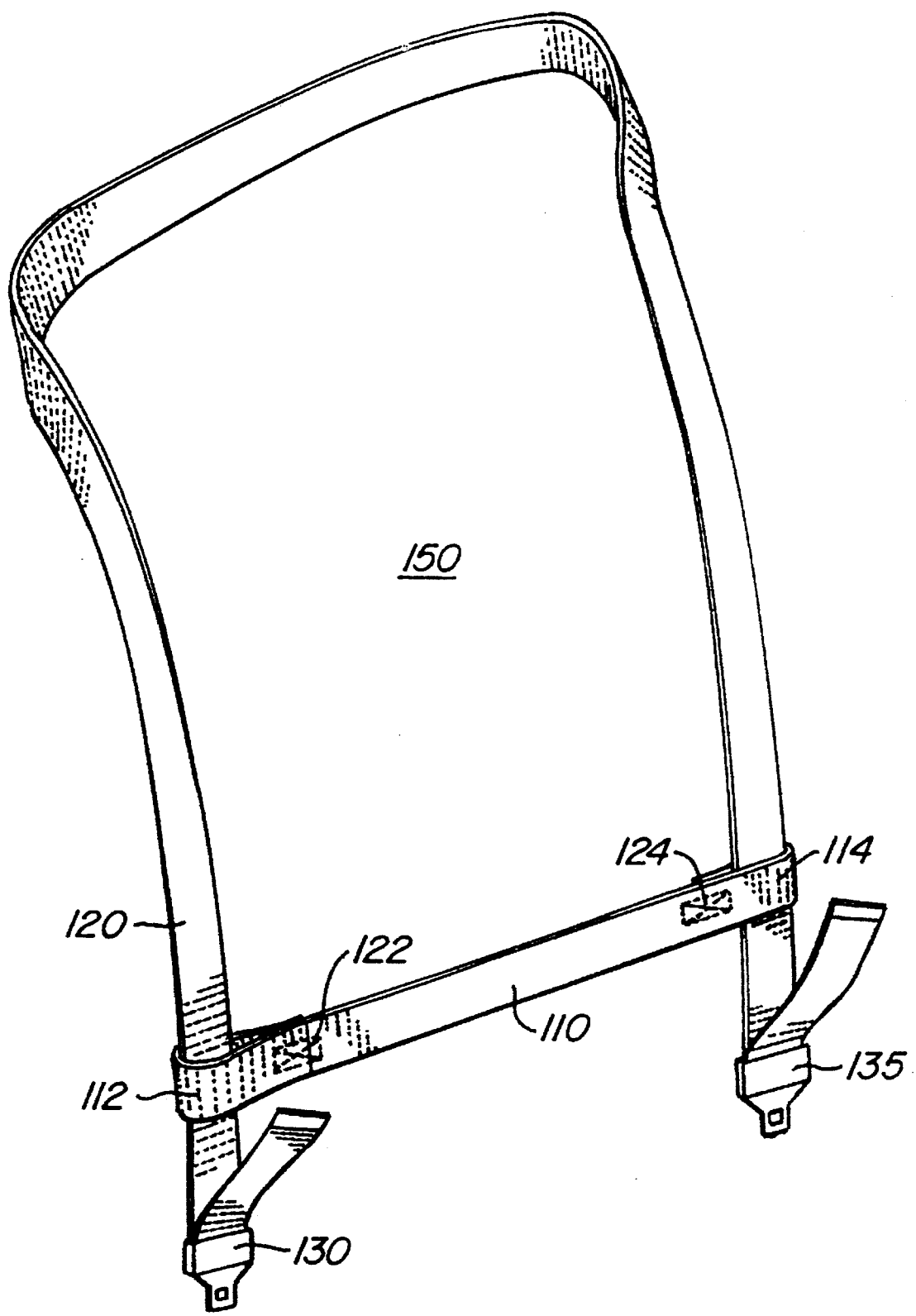
FIG. 4 is a perspective view of another embodiment of the securing device of the present invention.

Turning attention now to FIG. 4, there is shown another embodiment of the present invention. A lateral belt 110 is formed with loops 112, 114 that slideably receive the long belt portion 120. The loops are stitched to the lateral belt at stitched portions 122, 124, and the lateral belt 110 is free to slide along the long belt 120. This embodiment of the invention employs at the fastening end a pair of seat belt buckles 130, 135 having tongues, with built in sliding bar adjusters for tensioning. The fastening members on the anchoring end that receive the seat belt buckles are the same as the kind in the FIG. 2 embodiment, namely, seat belt buckle female receptacles.

In affixing the FIG. 4 embodiment harness to the child restraint, belt 120 is threaded through loop 112 in lateral belt 110, through the child restraint, and then through the other loop 114 in belt 110. Each end of belt 120 is threaded through seat belt buckles or adjusters 130, 135, and a cover is snapped over each seat belt buckle.

As can be seen in FIG. 1, with the present invention child restraints may be safely placed on bench seats in either the forward or rearward facing directions, without fear the carriers will fall off the seat.

The foregoing description is offered for illustrative purposes only. Numerous modifications and variations may be readily apparent to those skilled in the art, while still falling within the spirit and scope of the invention as claimed herein below.

What is claimed is:

1. A securing structure for allowing the fastening of an automobile child restraint to a bench seat of the kind used in public transportation vehicles, said securing structure, in combination, comprising:

a bench seat of the kind used in public transportation, having a substantially flat seating surface;

an automobile child restraint of the kind used in automobiles;

a fabric harness to secure said child restraint onto said bench seat seating surface, comprised of a plurality of fabric belts, said fabric belts surrounding said child restraint;

a pair of anchoring means for securing said harness to said bench seat;

said fabric belts comprising a first belt having two ends, each end connected to one of said anchoring means, and a second belt comprising a single length of material that is substantially shorter than said first belt and having two ends connected to said first belt, each of the ends of said second belt secured to said first belt at a position spaced from said anchoring means, said first and second belts forming an enclosure in said harness to receive said child restraint, and said first and second belts surrounding said child restraint in said enclosure;

wherein said automobile child restraint may be secured to a bench seat by said anchoring means.

2. The securing structure according to claim 1, wherein said first belt has a tensioning buckle interposed in said belt for tensioning said first belt.

3. The securing structure according to claim 1, wherein said second belt is fixedly connected to said first belt.

4. The securing structure according to claim 1, wherein said second belt it slidably connected to said first belt, said first belt sliding through loops on the ends of said second belt.

\* \* \* \* \*